United States Patent
Gooch et al.

(10) Patent No.: US 7,126,948 B2
(45) Date of Patent: *Oct. 24, 2006

(54) METHOD AND SYSTEM FOR PERFORMING A HASH TRANSFORMATION TO GENERATE A HASH POINTER FOR AN ADDRESS INPUT BY USING ROTATION

(75) Inventors: Mark Gooch, Citrus Heights, CA (US); Aled Edwards, Charfield (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 965 days.

This patent is subject to a terminal disclaimer.

(21) Appl. No.: 10/104,888

(22) Filed: Mar. 21, 2002

(65) Prior Publication Data

US 2003/0182448 A1 Sep. 25, 2003

(51) Int. Cl.
H04L 12/56 (2006.01)
(52) U.S. Cl. .................... 370/392; 370/395.32
(58) Field of Classification Search ............ 370/395.2, 370/392, 401; 711/216
See application file for complete search history.

(56) References Cited

U.S. PATENT DOCUMENTS

| | | | |
|---|---|---|---|
| 4,558,302 A * | 12/1985 | Welch | 341/51 |
| 5,371,499 A * | 12/1994 | Graybill et al. | 341/51 |
| 5,377,340 A * | 12/1994 | Seroussi et al. | 711/5 |
| 5,406,278 A * | 4/1995 | Graybill et al. | 341/51 |
| 6,173,384 B1 * | 1/2001 | Weaver | 711/216 |
| 6,292,483 B1 * | 9/2001 | Kerstein | 370/389 |
| 6,775,704 B1 * | 8/2004 | Watson et al. | 709/229 |
| 6,785,278 B1 * | 8/2004 | Calvignac et al. | 370/392 |
| 6,928,162 B1 * | 8/2005 | Heddes et al. | 380/28 |
| 2002/0059197 A1 * | 5/2002 | Hunter et al. | 707/3 |
| 2002/0116527 A1 * | 8/2002 | Chen et al. | 709/245 |
| 2004/0013112 A1 * | 1/2004 | Goldberg et al. | 370/389 |
| 2004/0236720 A1 * | 11/2004 | Basso et al. | 707/1 |

* cited by examiner

*Primary Examiner*—Hassan Kizou
*Assistant Examiner*—Salman Ahmed

(57) ABSTRACT

A method for performing a hash transformation in a network device to generate a hash pointer for an address input by using rotation. The method includes to step of receiving an address input. Rotated copies of the address input are subsequently logically combined in accordance with a key to generate a hashing result corresponding to the address input. The hash result is subsequently output.

14 Claims, 14 Drawing Sheets

```
if (control == 0)
   {
   Rout = R3 XOR R2 XOR R1 XOR R0;
   }
else
   {
   ROUT = R3 XOR R2 XOR R1 XOR R0 XOR Rout;
   }
```

FIG. 6

```
// function do_hash takes a value to hash and a hash key
// it returns a hash result. All are 32 bit values.
unit 32 do_hash (hash_val , hash_key)
unit 32 hash_val ;
unit 32 hash_fn ;
{
hash_result=32'b0 ;
for (bit = 0; bit < 32; bit ++)
    {
    if (hash_key [bit] == 1)
        {
        hash_result = hash_result XOR hash_val ;
        }
    // rotate hash_val right by 1 bit
    hash_val = (hash_val >> 1)  |   ( (hash_val & 0x1 << 31) ;
    }
return (hash_result) ;
}
```

FIG. 13

METHOD AND SYSTEM FOR PERFORMING A HASH TRANSFORMATION TO GENERATE A HASH POINTER FOR AN ADDRESS INPUT BY USING ROTATION

TECHNICAL FIELD

The present invention relates generally to digital communication on networked digital computer systems and communication system networks. More specifically, the present invention pertains to address indexing and digital communications network protocols.

BACKGROUND ART

The use of network based electronic communications and information processing systems for information control and information retrieval has rapidly proliferated in modern business environments. Within a typical enterprise, hundreds of client computer systems and server computer systems are constantly accessed by hundreds, or even thousands, of users for obtaining company information, news, competitive information, training materials, and the like, via one or more company wide LANs (local area networks) or WANs (wide area networks), or via the networked resources of the vast communications network known as the Internet.

Generally, digital communications networks (e.g., LANs, WANs, the Internet, etc.) are packet switched digital communications networks. As used generally, the term network refers to a system that transmits any combination of voice, video and/or data between users. The network includes the underlying architecture of connected clients and servers and their associated software (e.g., network operating system in the client and server machines, the cables connecting them and the supporting hardware, such as hubs, switches, routers, etc.). Packet switching refers to subdividing data comprising a message into a number of smaller units of data, or packets, and routing the packets individually through a number of nodes of the communications network.

The nodes of the digital communications network are generally made up of servers, clients, NOS (network operating system) services and supporting hardware. Servers are typically high-speed computer systems that hold programs and data or perform services that are shared by network users (e.g., the clients). The clients (e.g., desktop computer systems, workstations, and the like) are typically used to perform individualized, stand-alone processing and access the network servers as required. The actual communications path hardware is the cable (twisted pair, coax, optical fiber) that interconnects each network adapter. In wireless systems such as WLANs (wireless LANs) and the like, antennas, access point devices, and towers are also part of the network hardware.

Data communications within a network is generally managed by a one of a number of protocols such as, for example, TCP/IP, IPX, or the like. The physical transmission of data is typically performed by the access method (Ethernet, Token Ring, etc.) which is implemented in the network adapters that are plugged into the computer systems. The standardized communications protocols enable the widespread interoperability of communications networks and the widespread exchange of business related information.

In a large enterprise network or on the Internet, the Internet Protocol (IP) is used to route the packets among the various nodes or from network to network. Routers contain routing tables that move the datagrams (e.g., frames, packets, or the like) to the next "hop", which is either the destination network or another router. In this manner, packets can traverse several routers within an enterprise and a number of routers over the Internet.

Routers inspect the network portion (net ID) of the address and direct the incoming datagrams to the appropriate outgoing port for the next hop. Routers move packets from one hop to the next as they have routing information to indicate the most efficient path that a packet should take to reach it's destination. Eventually, if the routing tables are correctly updated, the packets reach their destination. Routers use routing protocols to obtain current routing information about the networks and hosts that are directly connected to them.

In a manner similar to routers, many modern switches now include routing functionality. Such routing switches, as with routers, function by forwarding data packets from one local area network (LAN) or wide area network (WAN) to another. Based on routing tables and routing protocols, switches/routers read the network address in each transmitted frame and make a decision on how to send it based on the most expedient route (traffic load, line costs, speed, bad lines, etc.). These network addresses include both a MAC address (media access control address) and an IP address (Internet protocol address).

The routing tables are indexed with respect to the addresses of the various nodes of the communications network. These addresses are used to route the packets to the required destination. Since each component on the network has its address, the resulting address space can be extremely large and unwieldy. Large data spaces can be difficult to work with within high-speed router/switches. The problem is even more pronounced with the routers operating at the core of the extremely large networks many enterprises are building, and with routers functioning near the core of the Internet. The resulting address space can span many hundreds of megabytes of memory. To manage the large address space, many prior art address space hashing schemes have been developed.

Address space hashing has become a widely used method to reduce the huge addressing space of a large network to a small, relatively inexpensive, memory table. Due to the fact that the majority of installed networks are based upon Ethernet protocols, many different types of Ethernet MAC address hashing-based address handling methods have been implemented. For example, when a packet arrives at a switch or router, it will need a destination address (DA) lookup to forward the packet, and possibly also a source address (SA) lookup to learn or authenticate the sending station. The network addresses will be used to generate hashing pointers, which are normally around 10–20 bits depending on table size.

The hashing pointer is generated using a hash function, wherein a hash function H can be described as a transformation that takes a variable-size input m (e.g., 48-bit MAC SA/DA), and a variable-size key k, and returns a fixed-size hash value "h" (e.g., hashing pointer), h=H(m, k). Each hashing pointer references a block of memory containing one or multiple MAC entries. Each entry stores the whole 48-bit MAC address and a switching tag related to this address. This entry contains information such as the next-hop forwarding data (the switch port(s) to forward the packet to, destination MAC address, destination VLAN, etc.), packet priority, etc.

When table referencing happens, the MAC address/addresses from the valid entry/entries under the hashing pointer will be compared against the original MAC address and a hit/miss or known/unknown decision will be made accordingly for the DA or SA lookup. Any further decisions based upon forwarding/learning etc., will be made based on the table search results and system setup. The goal of the system is to reduce the address size from a very large block (e.g., 48-bits or more) to a smaller more manageable block (e.g., 10–20 bits), while avoiding address aliasing, where two or more addresses generate a common hash pointer (e.g., a conflict or collision).

Hashing conflicts/collisions have a very adverse effect on the performance of the network router/switch. The hardware of the router/switch is optimized to perform the hashing address space translation very rapidly. In the event of a collision, either a new hash pointer is computed with a different key k (which consumes additional memory bandwidth) or a software based error handling routine is used to resolve the address aliasing. The software based routines execute much more slowly than the normal forwarding hardware. Thus, it becomes critical to network performance that the switch/router implement a fast and efficient address space hashing table.

One prior art solution to this problem involves use of an exceptionally large hashing pointer. For example, for a 48-bit input, a 24-bit hashing pointer can be implemented as opposed to, for example, a smaller 10-bit hashing pointer. The 24-bit hashing pointer reduces the likelihood of collisions as addresses are transformed from 48 to 24-bits as opposed to 48 to 10-bits. Unfortunately, the 24-bit hashing pointer results in a larger routing table (e.g., $2^{24}$ number of entries) which requires more memory and hence increases cost.

Another prior art solution is the use of a sophisticated hashing function for resolving the hash pointer. For example, a sophisticated hashing function can be designed to use each and every bit of a 48-bit input to generate a resulting 10–12-bit hashing pointer. The function can be configured to give a very high likelihood of different addresses transforming to different hashing pointers. Unfortunately, sophisticated and overly complicated hashing functions can be very difficult to implement in hardware. This can be even more problematic when the switch/router is designed to function at high-speed, wherein table lookups and routing decisions have to be made within a very small number of clock cycles.

Both of the above prior art solutions are increasingly outmoded, as the address spaces which are required to be efficiently indexed and tabled grow increasingly large. For example, newer versions of the Internet protocol (e.g.,IPv6) will use 128-bit IP addresses. Thus, prior art type sophisticated hashing functions designed to use each and every bit of a 128-bit input to generate a hashing pointer become extremely difficult to implement using high-speed hardware. Similarly, prior art techniques using relatively large hashing pointers with respect to a 128-bit input require too much memory to implement cost-effectively.

Thus, the prior art is problematic in that conventional address space hashing schemes have difficulty scaling efficiently to large address spaces. Prior art address space hashing schemes have difficulty transforming input addresses into hashing pointers at high speed without increasing the number of conflicts/collisions which occur. Additionally, prior art address space hashing schemes that may have sufficient conflict/collision performance are difficult to efficiently implement in high-speed hardware. The present invention provides a novel solution to these problems.

DISCLOSURE OF THE INVENTION

A method for performing a hash transformation in a network device to generate a hash pointer for an address input by using rotation is disclosed. In one embodiment, the method includes the step of receiving an address input. Rotated copies of the address input are subsequently logically combined in accordance with a key to generate a hashing result corresponding to the address input. The hash result is subsequently output for use with a routing table of the network device.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 shows a pseudo code representation of the logic function performed by a result combination unit in accordance with one embodiment of the present invention.

FIG. 13 shows a pseudo code implementation of the rotation based hash generation process in accordance with one embodiment of the present invention.

BEST MODES FOR CARRYING OUT THE INVENTION

Embodiments of the present invention provide an address space hashing solution that can scale effectively to large address spaces. In addition, embodiments of the present invention implement an address space hashing method and system that transforms input addresses into hashing pointers while reducing the number of conflicts/collisions which occur. Furthermore, the address space hashing method and system can be efficiently implemented in high-speed hardware.

Figure 1:
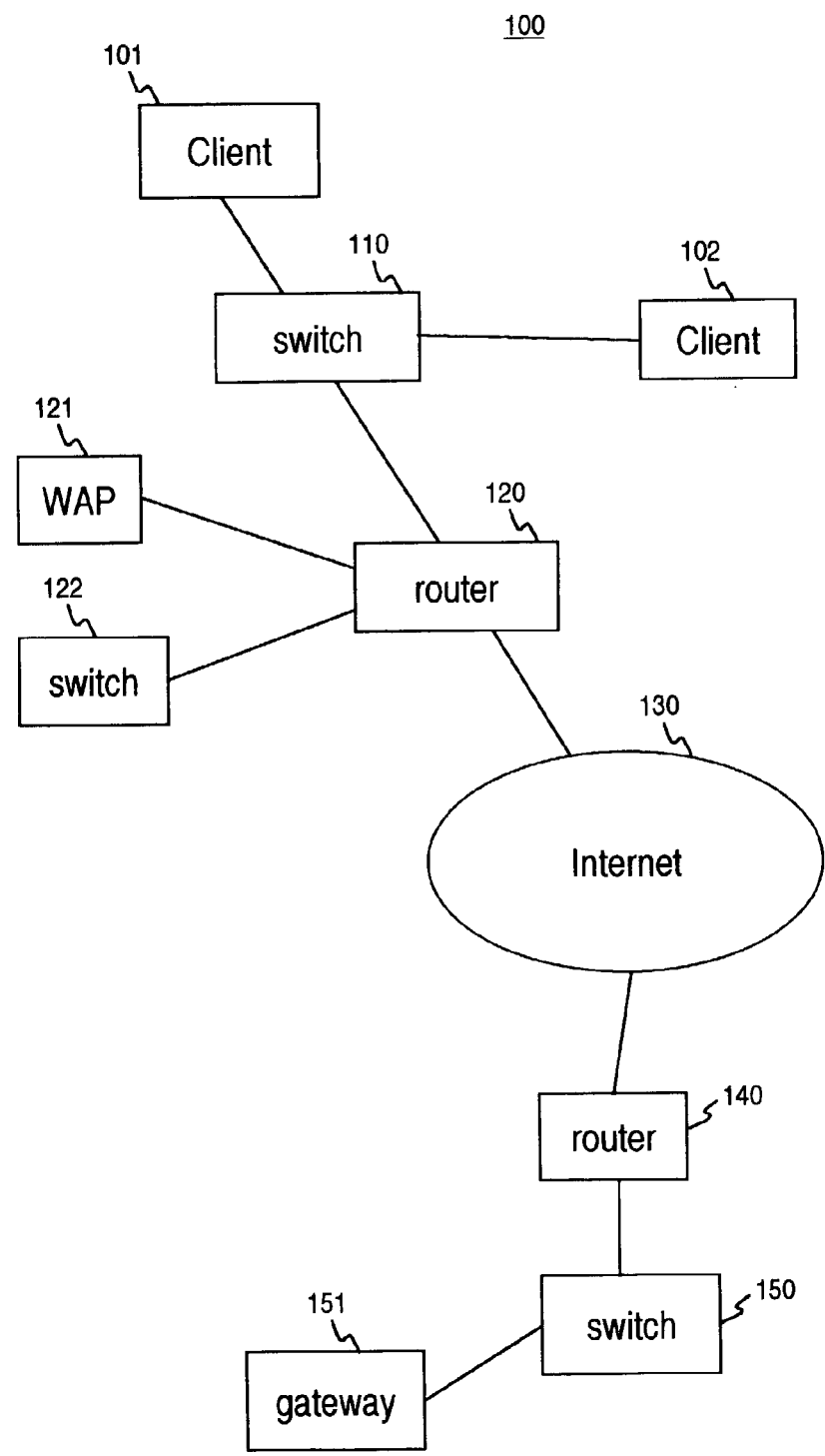
FIG. 1 shows a diagram of a network system in accordance with one embodiment of the present invention.

Referring now to FIG. 1, a network system 100 in accordance with one embodiment the present invention is shown. As depicted in FIG. 1, system 100 shows a router 120 and a switch 110 coupled to the Internet 130, in conjunction with router 140 and switch 150. These components comprise nodes which perform packet forwarding in accordance with embodiments of the present invention.

Referring still to FIG. 1, a client 101 and a client 102 are coupled to switch 110 to receive and transmit information to the network of system 100. Packets from client 101–102 are transmitted and received through switch 110 and via router 120. Based upon the address of the packets (e.g., MAC addresses, IP addresses), the router 120 routes them to and from their required destination. For example, packets from client 101 can be routed to wireless access port 121 for communication with mobile users, or can be routed to switch 122 for communication with other clients connected to switch 122, etc. Similarly, packets from client 101 can be routed to other destinations across the Internet 130, such as, for example, a server 151 or client 152. In this example, the packets would be forwarded through router 140, switch 150, and into server 151.

Accordingly, router 120 and router 140 perform packet and/or frame router functions (e.g., forwarding data packets or frames from one local area network (LAN) or wide area network (WAN) to another). Router 120 and router 140 maintain internal routing tables, which, in conjunction with standardized routing protocols, allow for storing the network address in each transmitted frame and make a decision on how to send it based on the most expedient route (traffic load, line costs, speed, bad lines, etc.).

In the present embodiment, routers 120 and 140, and switches 110, 122, and 150 are generally specialized hardware that is optimized for packet switched communications. However, this functionality can also be implemented in software on a general purpose computer having the necessary LAN and/or WAN interface(s).

Referring still to FIG. 1, router 120 functions by examining the packets coming from client 101 to determine the routing port for transmitting packets to and from client 101. In determining the routing port, the router 120 will perform a destination address (DA) lookup to forward the packet, and may also perform a source address (SA) lookup to learn or authenticate the sending client, in this case client 101. In accordance with embodiments of the present invention, router 120 will use the destination IP address to generate a hashing pointer and use this hashing pointer to reference its internal hashing table. Each hashing pointer references a block of memory containing one or multiple IP entries (e.g., addresses). The entries are configured to map to the ports of the router 120 and are used by the router 120 to determine which port to forward the packet through.

In the present embodiment, to speed the routing process for the packets, router 120 implements a method for performing parallel hash transformations on the MAC SA/DA addresses and on the IP source and destination addresses received from the various connected clients. The hash transformations are used to generate a hash pointer for each address input.

Figure 2:
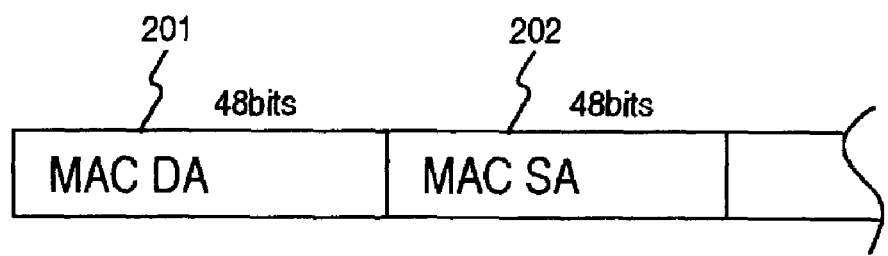
FIG. 2 shows a diagram of a 48-bit MAC destination address and a 48-bit MAC source address in accordance with one embodiment of the present invention.

FIG. 2 shows a diagram of a 48-bit MAC destination address 201 and a 48-bit MAC source address 202 as operated on by embodiments of the present invention. As depicted in FIG. 2, the 48-bit MAC SA/DA comprise the header of the data packet, referred to as a frame in an Ethernet based network. As known by those skilled in the art, the 48-bit MAC SA/DA comprise the hardware addresses of the various nodes connected to the network. For example, the network interface card of client 101 and client 102 (shown in FIG. 1) will have their own respective MAC addresses. These addresses are used by switch 110 to determine where to forward the Ethernet frames.

Figure 3:
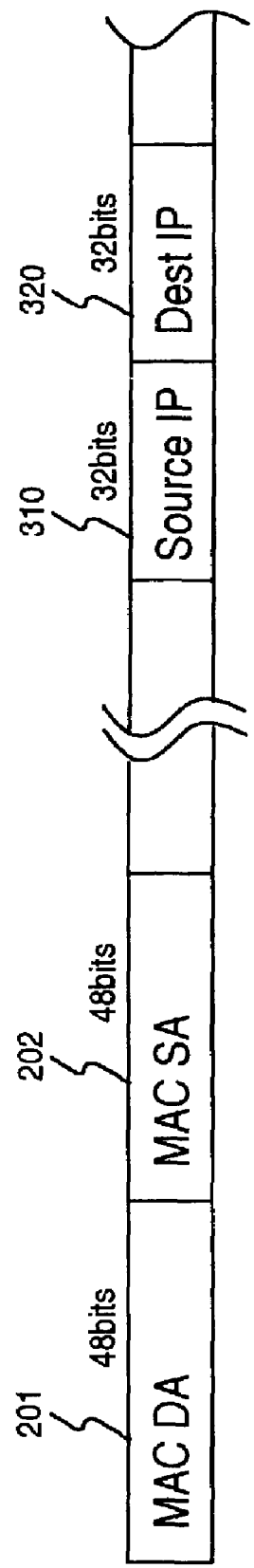
FIG. 3 a diagram of a 48-bit MAC destination address and a 48-bit MAC source address, in conjunction with a 32-bit source IP address and a 32-bit destination IP address in accordance with one embodiment of the present invention.

FIG. 3 shows a diagram of a 48-bit MAC destination address 301 and a 48-bit MAC source address 302, in conjunction with a 32-bit source IP address 310 and a 32-bit destination IP address 320, as operated on by embodiments of the present invention. FIG. 3 shows a case where an Ethernet network (e.g., using layer 2 MAC SA/DA addresses) is used to support TCP/IP networking protocols, wherein sources and destinations are specified using IP addresses 310 and 320. As shown in FIG. 3, the IP addresses 310 and 320 are included within the frame after the MAC SA/DA addresses 201 and 202.

Figure 4:
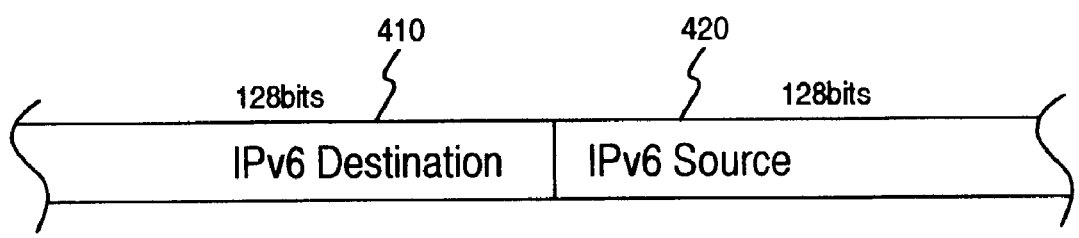
FIG. 4 shows a diagram of a 128-bit source IP address and 128-bit destination IP address in accordance with one embodiment of the present invention.

FIG. 4 shows a diagram of a 128-bit source IP address 410 and 128-bit destination IP address 420 as operated on by embodiments of the present invention. In this case, the frame is in accordance with version 6 of Internet protocols (e.g., IP version 6, or IPv6). In order to expand the number of Internet addresses available, as known by those skilled in the art, IPv6 addresses are 128-bits in length. In all other respects, frames are transmitted between network nodes in the same manner as for IPv4 addresses.

Figure 5:
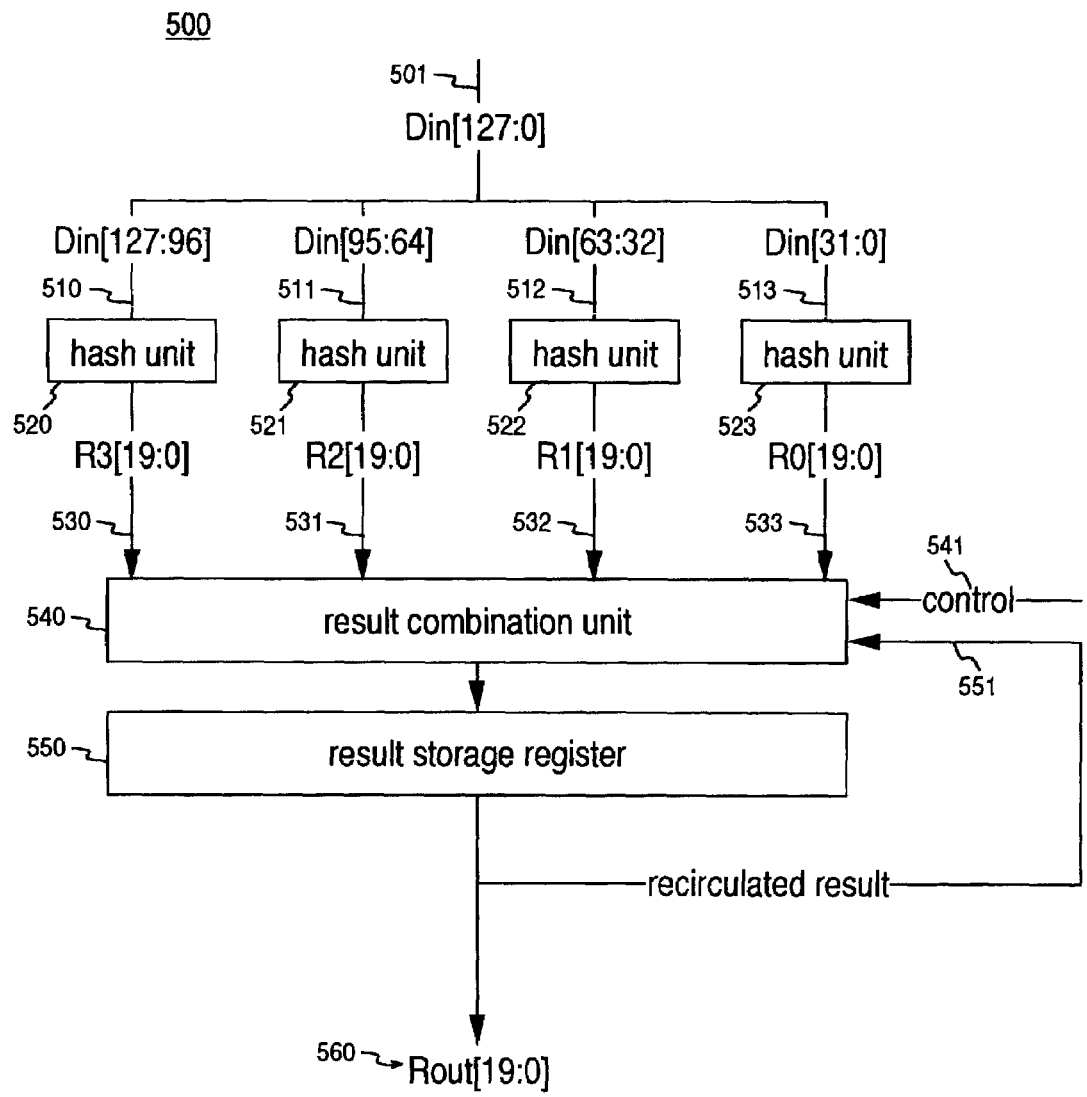
FIG. 5 a diagram of a parallel hashing system in accordance with one embodiment of the present invention.

FIG. 5 shows a diagram of a parallel hashing system 500 in accordance with one embodiment of the present invention. As depicted in FIG. 5, the hashing systems 500 includes four parallel hash units 520–523 configured to execute hash transformations on an address input in parallel. In this embodiment, system 500 operates on an input address of up to 128 bits (e.g., an IPv6 address input).

The hashing system 500 is implemented within network devices, for example, switch 110, router 120, router 140, and the like, in order to perform high-speed efficient forwarding in accordance with the present invention. The parallel hash units 520–523 are coupled to receive respective portions 510–513 of the 128-bit data input 501 as shown. The hash units 520–523 execute their respective hash transformations in parallel to generate the resulting outputs 530–533. The outputs 530–533 are received by a result combination unit 540 which functions by recombining the outputs to obtain a 20-bit hash result 560 as shown.

In this manner, system 500 of the present embodiment provides an address space hashing solution that can scale effectively to large address spaces. By breaking down the hash generation into parallel execution units 520–523, the hash transformations can be performed on the large address input (e.g., 128-bit) much more quickly than attempting to perform a single monolithic hash transformation on the large address input using a single large hash unit. Parallel execution is much faster.

The parallel hash transformation of the present embodiment also provides an address space hashing solution that transforms input addresses into hashing pointers while reducing the number of conflicts/collisions which occur. Dividing the large address input into multiple hash unit inputs allows for more sophisticated hash algorithms to be implemented, whereby the hash result 560 is influenced by a greater proportion of the bits of the address input 501. Parallel execution allows more logical operations to be run on the bits comprising the address input 501.

Yet another advantage provided by system 500 of the present embodiment is the fact that parallel hash unit execution can be efficiently implemented in high-speed hardware. By dividing the large address input 501 amongst multiple hash execution units 520–523, the number of logic gates which a signal must cascade through remains limited in comparison with, for example, prior art monolithic, non-parallel schemes. Consequently, signal propagation through the parallel hash execution units of system 500 allow for very high-speed operation. For example, embodiments in accordance with system 500 can generate the hash result 560 from the address input 501 within a single clock cycle (e.g., 5 ns or less). Accordingly, system 500 can be integrated into a single ASIC.

It should be noted that system 500 of the present embodiment can be implemented, in whole or in part, in software executing on one or more digital processors. For example, the parallel execution units 520–523 can be implemented as parallel execution threads which can be distributed across parallel processors of a computer system. In such embodiment, it is desired that the hash execution is implemented in parallel, and as such, software for doing so can be distributed amongst computer system platforms or amongst processors of a single computer system.

Referring still to FIG. 5, in the present embodiment, the result storage register 550 functions by allowing system 500 to accept successive 128-bit address inputs and generate a corresponding hash result 560. The result storage register 550 thus allows system 500 to operate on even wider address inputs (e.g., 256 bit). The result storage register 550 utilizes a recirculate result path 551, in conjunction with a control input 541, to recombine a previous result with a next result. This allows system 500 to perform hash transformations on wider inputs over multiple clock cycles. For example, system 500 can take a 128-bit address input and generate a resulting 20-bit hash result in one clock cycle, or alternatively, using the result storage register 550, system 500 can take 256 bits of address input data over two clock cycles and combine them into a single 20-bit result. The pseudocode for the result combination unit is shown in FIG. 6.

FIG. 6 shows a pseudo code representation of the result combination unit 540 of FIG. 5. As shown in FIG. 6, when control input 541 is assigned to zero, the recirculate result 551 is disabled, and the resulting output 560 is an XOR of the outputs of the hash units 520–523 (e.g., R3, R2, R1, and R0). When control input 541 is assigned to one, the recirculate result 551 is enabled, and the resulting output 560 is an XOR of the outputs of the hash units 520–523 and the recirculate result Rout 560 (e.g., R3, R2, R1, R0, and Rout).

It should be noted that embodiments of the present invention can use other types of logic to implement the hash functions of the hash units 520–523 besides XOR. The parallel hash transformation aspect of the present invention provides enough performance margin to implement more complex hash functions.

Additionally, it should be noted that embodiments of the present invention can operate in conjunction with other types of address inputs besides 128-bit address inputs. For example, embodiments of the present invention can operate with address data that is less than 128 bits, with the unused bits being set to 0. Examples include 48-bit MAC addresses, 32-bit IPv4 addresses, and the like. Similarly, embodiments of the present invention can utilize greater or lesser degrees of parallel execution. For example, also system 500 utilizes four parallel hash units, other numbers of parallel hash units can be implemented (e.g., 2, 8, 10, etc.).

Figure 7:
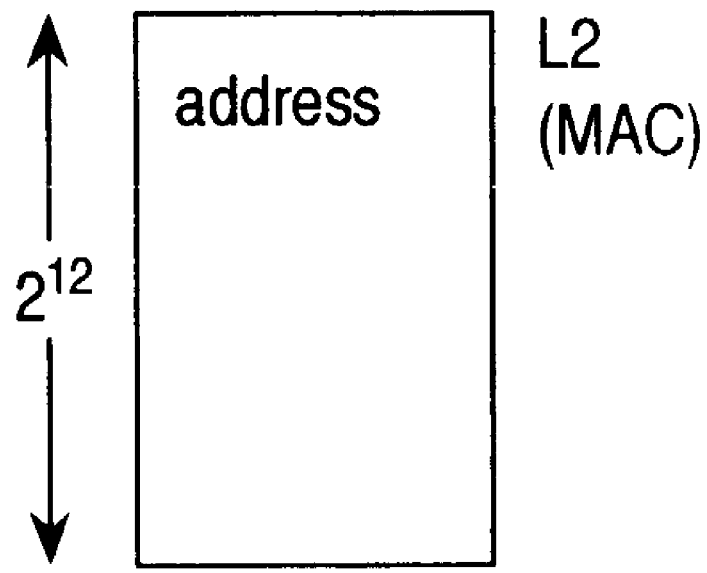
FIG. 7 shows a routing table of 12-bit hash pointers generated from a 48-bit address input in accordance with one embodiment of the present invention.
Figure 8:
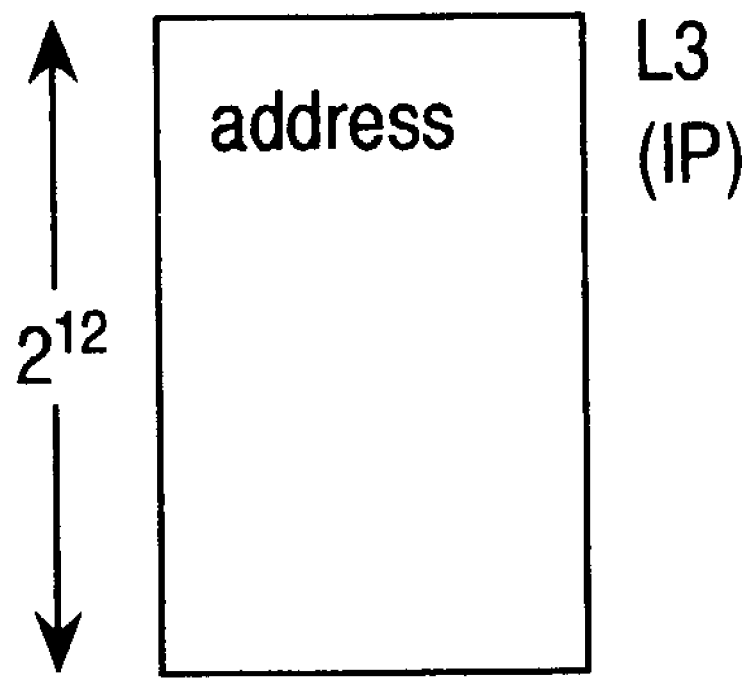
FIG. 8 shows a routing table of 12-bit hash pointers generated from a 32-bit IP address input in accordance with one embodiment of the present invention.
Figure 9:
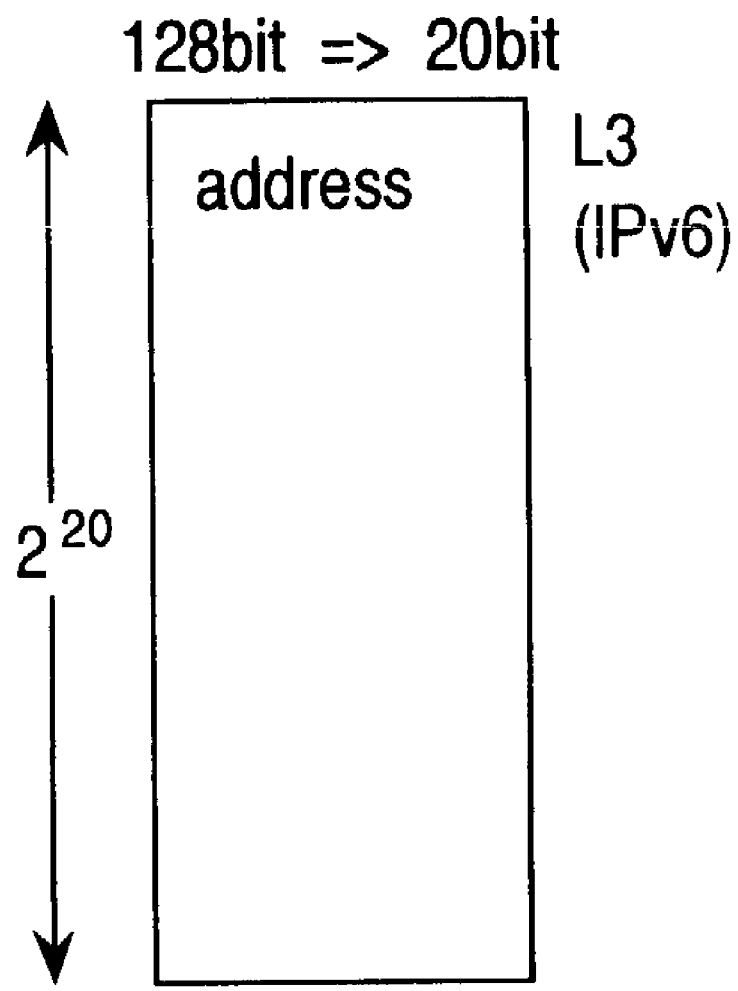
FIG. 9 shows a routing table of 20-bit hash pointers generated from a 128-bit IP address input in accordance with one embodiment of the present invention.

FIG. 7, FIG. 8, and FIG. 9 show routing tables generated by systems in accordance with the present invention. FIG. 7 shows a routing table 700 of 12-bit hash pointers generated from a 48-bit address input. As depicted in FIG. 7, the routing table 700 has $2^{12}$ entries for 48-bit MAC addresses as used in layer 2 switching.

FIG. 8 shows a routing table 800 of 12-bit hash pointers generated from a 32-bit IP address input. As with routing table 700 of FIG. 7, routing table 800 has $2^{12}$ entries for 32-bit IP addresses used in layer 3 IP routing.

FIG. 9 shows a routing table 900 of 20-bit hash pointers generated from a 128-bit IP address input. As depicted in FIG. 9, the routing table 900 has $2^{20}$ entries for 128-bit IP addresses used in the IPv6 routing protocols (layer 3).

Figure 10:
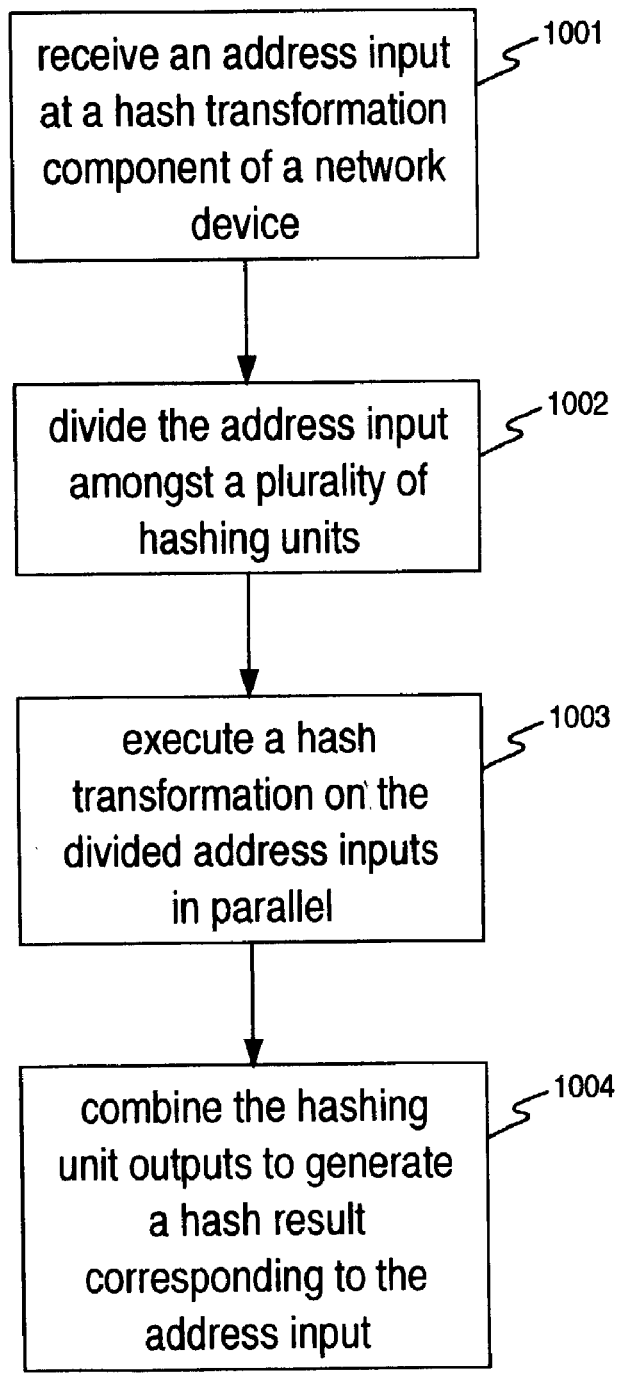
FIG. 10 shows a flowchart of the steps of a parallel hash generation process in accordance with one embodiment of the present invention.

FIG. 10 shows a flowchart of the steps of a process 1000 in accordance with one embodiment of the present invention. As depicted in FIG. 10, process 1000 shows the operating steps involved in a parallel hash transformation operation as performed when transforming packet address inputs into hash pointer outputs.

Process 1000 begins in step 1001 where an address input (e.g., 128-bit address input, etc.) is received at a hash transformation component of a network device. The hash transformation component functions by generating hash results from the address inputs. The hash results, in this case hash pointers to a forwarding table, are used by the network device (e.g., a switch or router) to forward packets or frames along the network. In step 1002, the address input is divided amongst a plurality of hashing units. For example, as described above, in a case where four parallel hash units are used to process a 128-bit address input, the 128-bit address input is divided into respective 32-bit inputs for the hash units. In step 1003, the hash units execute a hash transformation on the divided address inputs in parallel. Subsequently, in step 1004, the hashing unit outputs are combined to generate a hash result corresponding to the address input.

Figure 11:
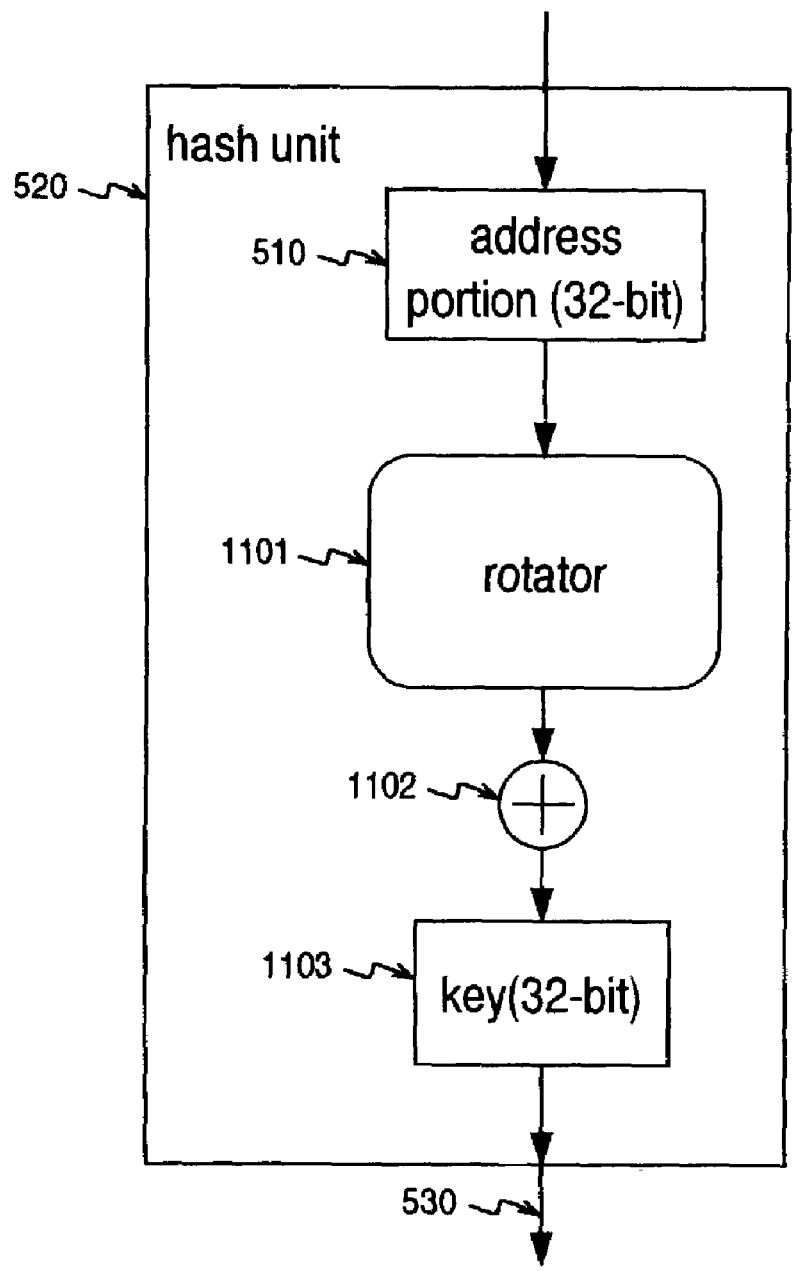
FIG. 11 shows a flow chart of the steps of a generalized rotation process as performed by a hash unit in accordance with one embodiment of the present invention.

Referring now to FIG. 11, a flowchart of the steps of a process 1100 in accordance with one embodiment of the present invention is shown. Process 1100 shows the operating steps performed by a parallel hash unit as it generates its respective portion of the hash result.

Process 1100 begins in step 1101, where a respective address portion is received in one of a plurality of parallel hash execution units (e.g., hash unit 520 shown in FIG. 5). In step 1102, rotated versions of the address portion are generated by the hash execution unit. The rotated versions of the address portion are used in order to reduce the likelihood of collisions between different hash unit results (further described in the discussion of FIG. 12 below). In step 1103, the resulting rotated versions of the address portion are logically combined based on a hash key. In this embodiment, the logical combination is implemented using an XOR operation. Subsequently, in step 1104, the result from the hash unit is output, where it is subsequently combined with results of the other parallel hash units to generate the overall hash result (e.g., hash result 560).

Figure 12:
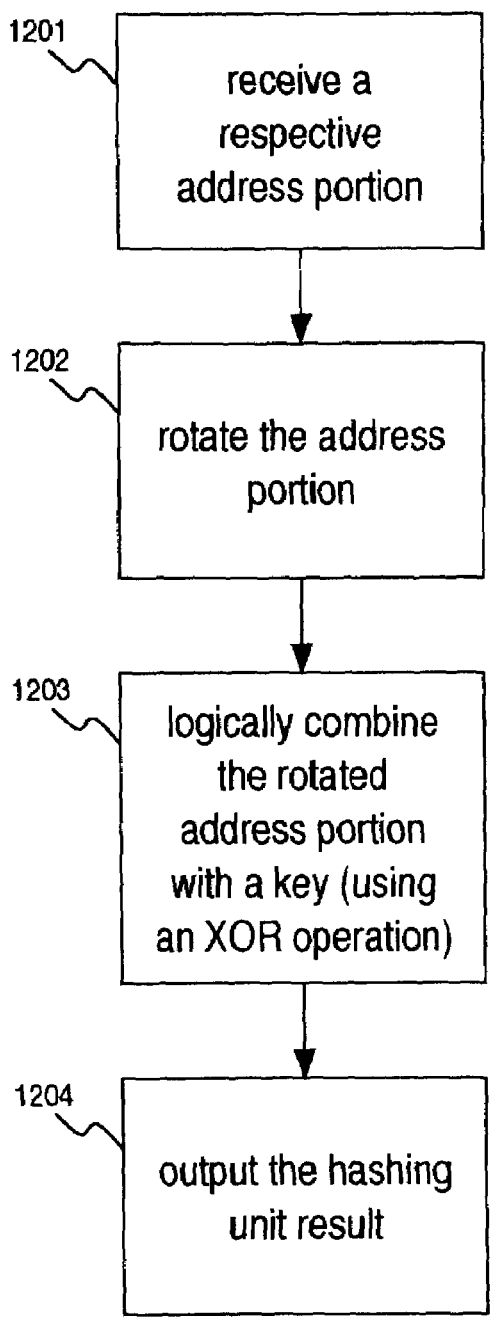
FIG. 12 shows a diagram of the internal components of a hash unit in accordance with one embodiment of the present invention.

Referring now to FIG. 12, a diagram of an exemplary hash unit 520 is shown in greater detail. FIG. 12 shows a rotator component (barrel shifter) 1210, a hash key 1220, a logical mask component 1230 and a logical combiner (XOR) 1240.

As described above, hash unit 520 functions by performing a rotation of the input address 510 according to a hash key 1220, and generates a hash result 530. The rotator 1210 generates 32 versions of the input address, as ROT00 1211, ROT01 1212, etc., up to ROT31 1213, where ROT00 1211 is an exact copy of the input address 510, ROT01 1212 is the input address 510 rotated right by 1 bit, etc., up to ROT31

1213 which is the input address 510 rotated right by 31 bits. The hash key 1220 is a 32 bit value that is used to determine how to hash the input address 510 to generate the hash result 530. The logical mask component 1230 takes all of the outputs from the rotator 1210 (ROT00 1211 to ROT31 1213) and the 32-bit hash key K 1221 to generate 32 intermediate 32-bit results R00 1231, R1 1232, etc., up to R31 1233. If a given bit xx (where 00<=xx<=31) of the hash key K 1221 is 0, then Rxx will be 32 bits of 0, otherwise Rxx will be equal to the 32-bit value of ROTxx. The logical combiner 1240 performs an XOR function on all of the 32-bit inputs R00 1131, R01 1232, etc., up to R31 1233 to generate the final 32-bit hash result 530, i.e., hash result 530 is R00 XOR R01 XOR . . . XOR R31.

Thus, by implementing a rotator component 1210, the parallel hash units of the present embodiment (e.g., hash units 520–523) can perform fast hash algorithm execution while simultaneously minimizing the chances of hash pointer conflicts/collisions. For example, where a relatively simple hash method can be implemented by taking a number of bits of the input address and either re-arranging them or combining them together using exclusive-or operations to generate an address, such simple hash methods are not always very efficient, and can result in a large number of collisions. The reasons for this are threefold. First, such simple methods do not use all of the bits from the input data to generate the result. Second, each bit of the result is generated from only a few bits of the input data. Third, the algorithms used are relatively simple and rely on the XOR operator.

By implementing a rotator component 1210, the parallel hash units of the present embodiment implement a more efficient solution, whereby the input data (e.g., address portion 510) is rotated. By rotating, it is ensured that each single bit of the address portion 510 has the potential to modify every single bit of the result 530. This results in a more efficient algorithm which produces a better spread of results. In this manner, one objective of the present embodiment is to generate a function—the hash algorithm—that produces a large change in the output result for a very small change in the input data.

FIG. 13 shows a pseudo code implementation of the rotation hash generation process as implemented by hash unit 520 in accordance with one embodiment of the present invention. In this embodiment, as shown in FIG. 13, the 32-bit address input "hash_val" is rotated completely through 32-bit positions. For each rotation, successive bits of hash_key are examined to determine if the currently rotated input address is added (XORed) into the final result. For example, if bit n (where 0<=n<=31) of the hash key is 1, then the input address is rotated right by n bits and added (XORed) into the final result.

Figure 14:
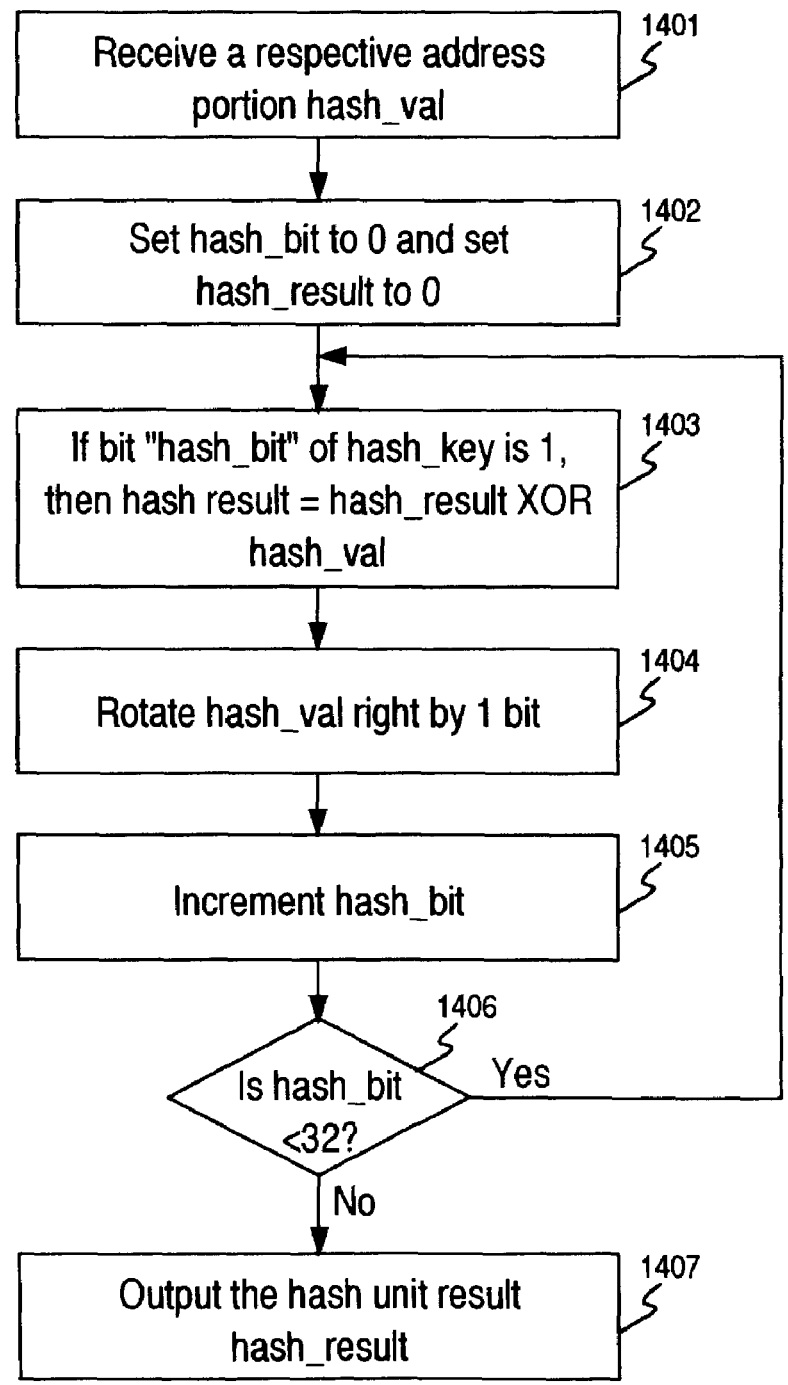
FIG. 14 shows a flowchart of the steps of a rotation process performed by a parallel hash unit in accordance with one embodiment of the present invention.

Referring now to FIG. 14, a flowchart of the steps of a process 1400 in accordance with one embodiment of the present invention is shown. Process 1400 shows the operating steps performed by a parallel hash unit as it generates its respective portion of the hash result.

Process 1400 begins in step 1401, where a respective address portion (hash_val) is received in one of a plurality of parallel hash execution units (e.g., hash unit 520 shown in FIG. 5). In step 1402 a variable hash_bit is initialized to 0—this is used to "walk" through each bit in the hash_key. Also in step 1402 a 32-bit variable hash_result is initialized to 0—this is used to maintain intermediate results as the hashing operation proceeds. In step 1403, bit "hash_bit" of hash_key is examined—if it is a 1, then hash_result is modified by executing an exclusive-or function such that "new" hash_result is "old" hash_result XORed with hash_val. In step 1404, hash_val is rotated right by 1 bit, thus effecting the rotation operation. Step 1405 increments the value of hash_bit. In step 1406, if hash_bit is less than 32 then the flow moves back to step 1403 as the process has not yet completed, otherwise we move to step 1407 which outputs the final result hash_result.

Thus, the rotation method implemented by the present embodiment provides better results than, for example, a "shift and add" approach, whereby the input data is shifted (either left or right) and "added" ( e.g., implemented via an XOR operation) into a result according to the chosen hash key. The so-called "shift and add" approach leads to a larger number of collisions/conflicts than the rotation method of the present embodiment due to the fact that certain bits of the input address cannot contribute to the hash output.

It should be noted that although the rotation method of the present embodiment as described in conjunction with a 32-bit address input, address inputs of other widths can be implemented (e.g., 12 bit, 8 bit, and the like). Embodiments of the present invention implement the rotation method within parallel hash units in order to efficiently handle address inputs and fast hardware (e.g., within a single ASIC). The rotation method provides high-quality hash functions, reducing the occurrences of collisions/conflicts, while the parallel execution leads to high speed operation.

Thus, a method and system for performing a hash transformation to generate a hash pointer for an address input by using rotation has been disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to use the invention and various embodiments with various modifications as are suited to the particular use contemplated. It is intended that the scope of the invention be defined by the Claims appended hereto and their equivalents.

What is claimed is:

1. A method for performing a hash transformation in a network device to generate a hash pointer for an address input, wherein the address input is a 12 bit address input, comprising:
   receiving the address input;
   logically combining rotated versions of the address input in accordance with a key to generate a hash result corresponding to the address input, wherein the hash transformation is configured to be executed within a single clock cycle such that the hash result is generated within the single clock cycle; and
   outputting the hash result for use with a routing table of the network device, wherein the hash result is a 5 bit hash result.

2. The method of claim 1 wherein the hash result is a 3 bit hash result.

3. The method of claim 1 wherein the hash transformation is configured to be executed within a single clock cycle such that the hash result is generated within the single clock cycle.

4. A hash transformation system for performing a hash transformation in a network device comprising:
   an input for receiving an address, wherein the address is a 12 bit input;

a rotator unit coupled to the input for rotating the address to generate rotated versions of the address;

a key register for storing a key;

a combiner coupled to the key register for logically XORing the rotated versions of the address in accordance with the key to generate a hash result, wherein the hash transformation is configured to be executed within a single clock cycle such that the hash result is generated within the single clock cycle; and an output coupled to the combiner for transmitting the hash result.

5. The method of claim 4 wherein the hash result is a 3 bit hash result.

6. A hash transformation system for performing a hash transformation in a network device comprising:

means for receiving an address input, wherein the address is a 12 bit input;

means for rotating the address input to generate rotated versions of the address input;

means for logically combining the rotated versions of the address input in accordance with a key to generate a hashing result corresponding to the address input, wherein the hash transformation is configured to be executed within a single clock cycle such that the hash result is generated within the single clock cycle; and means for outputting the hash result.

7. The system of claim 6 wherein the hash transformation is configured to be executed within a single clock cycle such that the hash result is generated within the single clock cycle.

8. A parallel hash transformation system for generating a hash pointer for an address input, comprising:

an input configured to accent an address, wherein the hash transformations on the apportioned address inputs are configured to be executed in parallel within a single clock cycle such that the hash result is generated from the address input within the single clock cycle;

a plurality of parallel hash units coupled to the input to receive respective portions of the address, the hash units configured to execute a hash transformation on the respective portions of the address in parallel and generate respective hash outputs, wherein the hash transformation is configured to be executed within a single clock cycle such that the hash result is generated within the single clock cycle, each of the parallel hash units further comprising:

a unit input for receiving the respective portion;

a rotator unit coupled to the unit input for rotating the portion to generate rotated address portions;

a key register for storing a key;

a logical operator for logically combining the rotated address portions in accordance with the key to generate the hash output; and a unit output for transmitting the hash output;

a combination unit coupled to receive the respective hash outputs, the combination unit configured to combine the respective hash outputs into a hash result; and a system output configured coupled to the combination unit to transmit the hash result.

9. The system of claim 8 wherein the hash transformation system is implemented within a single hardware ASIC.

10. The system of claim 8 wherein the system is implemented within a router configured to use the hash result for storing routing addresses with a routing table.

11. The system of claim 8 wherein the system is implemented within a switch configured to use the hash result for storing forwarding information within a forwarding table.

12. The system of claim 8 wherein the logical operator for logically combining the rotated address portions in accordance with the key to generate the hash output is an exclusive-or logical operator.

13. A computer readable media having computer readable code which when executed by a network device cause the device to implement a method for performing a hash transformation to generate a hash pointer for an address input, wherein the hash transformation is configured to be executed within a single clock cycle such that the hash result is generated within the single clock cycle, comprising:

receiving an address input, wherein the address is a 12 bit input;

rotating the address input to generate rotated versions of the address input;

logically combining the rotated versions of the address input in accordance with the key to generate a hashing result corresponding to the address input; and outputting the hash result.

14. The media of claim 13 wherein the hash transformation is configured to be executed within a single clock cycle such that the hash result is generated within the single clock cycle.

* * * * *

UNITED STATES PATENT AND TRADEMARK OFFICE
CERTIFICATE OF CORRECTION

| | | |
|---|---|---|
| PATENT NO. | : 7,126,948 B2 | Page 1 of 1 |
| APPLICATION NO. | : 10/104888 | |
| DATED | : October 24, 2006 | |
| INVENTOR(S) | : Mark Gooch et al. | |

It is certified that error appears in the above-identified patent and that said Letters Patent is hereby corrected as shown below:

In column 11, line 33, in Claim 8, delete "accent" and insert -- accept --, therefor.

Signed and Sealed this

Twenty-third Day of February, 2010

David J. Kappos
*Director of the United States Patent and Trademark Office*